(12) United States Patent
Mori et al.

(10) Patent No.: US 8,125,658 B2
(45) Date of Patent: Feb. 28, 2012

(54) ELECTRONIC DEVICE INCLUDING NON-VOLATILE DISPLAY PORTION

(75) Inventors: Hiromi Mori, Nagoya (JP); Kazutaka Yamada, Toyoake (JP); Takahiro Hosokawa, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 1074 days.

(21) Appl. No.: 11/956,752

(22) Filed: Dec. 14, 2007

(65) Prior Publication Data

US 2008/0144070 A1    Jun. 19, 2008

(30) Foreign Application Priority Data

Dec. 19, 2006    (JP) ................. 2006-341132

(51) Int. Cl.
*G06F 15/00* (2006.01)
*G06F 3/12* (2006.01)
*G06K 1/00* (2006.01)

(52) U.S. Cl. ........................ 358/1.13; 358/1.1
(58) Field of Classification Search ............ 358/1.13
See application file for complete search history.

(56) References Cited

U.S. PATENT DOCUMENTS

| 7,278,705 B2 | 10/2007 | Ohara |
| 2006/0158686 A1 | 7/2006 | Watanabe |
| 2008/0007486 A1 | 1/2008 | Fujinawa et al. |

FOREIGN PATENT DOCUMENTS

| JP | 10-240393 | | 9/1998 |
| JP | 2002-181595 | A | 6/2002 |
| JP | 2003-108037 | A | 4/2003 |
| JP | 2004-012962 | | 1/2004 |
| JP | 2004-037705 | A | 2/2004 |
| JP | 2004-358963 | A | 12/2004 |
| JP | 2005-225177 | | 8/2005 |
| JP | 2005242081 | A * | 9/2005 |
| JP | 2006-126240 | A | 5/2006 |
| JP | 2006-139145 | | 6/2006 |
| JP | 2006-201460 | | 8/2006 |
| JP | 2006-201481 | | 8/2006 |
| JP | 2006-208536 | A | 8/2006 |
| JP | 2006-319585 | A | 11/2006 |

OTHER PUBLICATIONS

JP Office Action dtd Jan. 13, 2009, JP Appln. 2006-341132.

* cited by examiner

*Primary Examiner* — Douglas Tran
(74) *Attorney, Agent, or Firm* — Banner & Witcoff, Ltd.

(57) ABSTRACT

An electronic device includes a non-volatile display portion, a first determination portion, a display control portion, a built-in clock, an internal battery, and a second determination portion. The first determination portion is configured to determine a state of the electronic device. The display control portion is configured to display information of a type appropriate for the state determined by the first determination portion on the display portion based on shut-off of power supply from an external power source. The second determination portion is configured to determine whether the internal battery is usable. Furthermore, the display control portion is configured to display information on the internal battery on the display portion according to a result of determination by the second determination portion indicating that the internal battery is usable.

8 Claims, 13 Drawing Sheets

FIG.5

INFORMATION ON MAINTENANCE DURING SLEEP MODE

THE MACHINE IS NOW IN SLEEP MODE.
IT WILL RETURN TO NORMAL STATE WHEN YOU OPERATE A BUTTON
ON THE MAIN BODY OR MAKE AN ACCESS TO IT FROM THE PC.

THE FOLLOWING OPERATIONS WILL
AUTOMATICALLY TAKE PLACE DURING SLEEP MODE.
THESE OPERATIONS DO NOT BRING THE MACHINE BACK INTO NORMAL STATE

NOVEMBER 12  21:00  INK HEAD CLEANING (FOR PREVENTING CLOGGING OF INK)
NOVEMBER 13  21:00  INK HEAD CLEANING (FOR PREVENTING CLOGGING OF INK)
NOVEMBER 14  12:00  SCANNER LAMP ILLUMINATION (OPERATION FOR LAMP MAINTENANCE)

FIG.6

```
NOW IN SLEEP MODE

TIME OF SLEEP MODE TRANSITION: NOVEMBER 12  15:30
TELEPHONE  TIME OF LAST INCOMING CALL : NOVEMBER 12  14:55
FAX  TIME OF LAST RECEIPT : NOVEMBER 11  20:45
REMAINING INK LEVEL :  C:80%  M:75%  Y:90%  K:80%
```

FIG.8

```
                    BATTERY REPLACEMENT

THE INTERNAL BATTERY IS NOT CHARGED
 BECAUSE THE MACHINE IS NOT POWERED NOW.
 UPON POWERING ON THE MACHINE, THE BATTERY WILL BE DISCHARGED
 AND TIME SETTINGS MAY BE RESET.
 ALTHOUGH CHARGING WILL BE COMPLETED AFTER A PERIOD OF
 TIME FOLLOWING POWER-ON, YOU CANNOT MAKE TIME SETTING AND
 THE LIKE IN THE MEANTIME. IF YOU NEED TO SET TIME QUICKLY,
 PLEASE CHANGE THE BATTERY IN THE MAIN BODY WITH A CHARGED ONE.

HOW TO CHANGE BATTERY

1: OPEN THE UPPER COVER OF THE MAIN BODY
 2: OPEN THE COVER MARKED "BATTERY"
    ON THE RIGHT FRONT OF THE MAIN BODY
 3: TAKE OUT THE BATTERY AND SET A NEW BATTERY
    CAUTION : SET THE BATTERY WITH ITS "+" POLE ON THE RIGHT
```

FIG.9

```
                    HOW TO SET TIME

WHEN TIME SETTING OF THE MACHINE HAS BEEN RESET,
 YOU CAN RESET IT AS FOLLOWS:

1: PRESS MENU KEY
 2: ON THE MENU DISPLAYED ON LCD, SELECT "4. INITIAL SETTING"
    WITH ▲ KEY OR ▼ KEY AND PRESS SET KEY
 3: ON THE MENU DISPLAYED ON LCD, SELECT "TIME SETTING"
    WITH ▲ KEY OR ▼ KEY AND PRESS SET KEY
 4: ENTER A TIME WITH NUMERIC KEYS AND  KEY AND R KEY,
    AND PRESS SET KEY

SERIAL NUMBER OF THIS MACHINE : 12345678
```

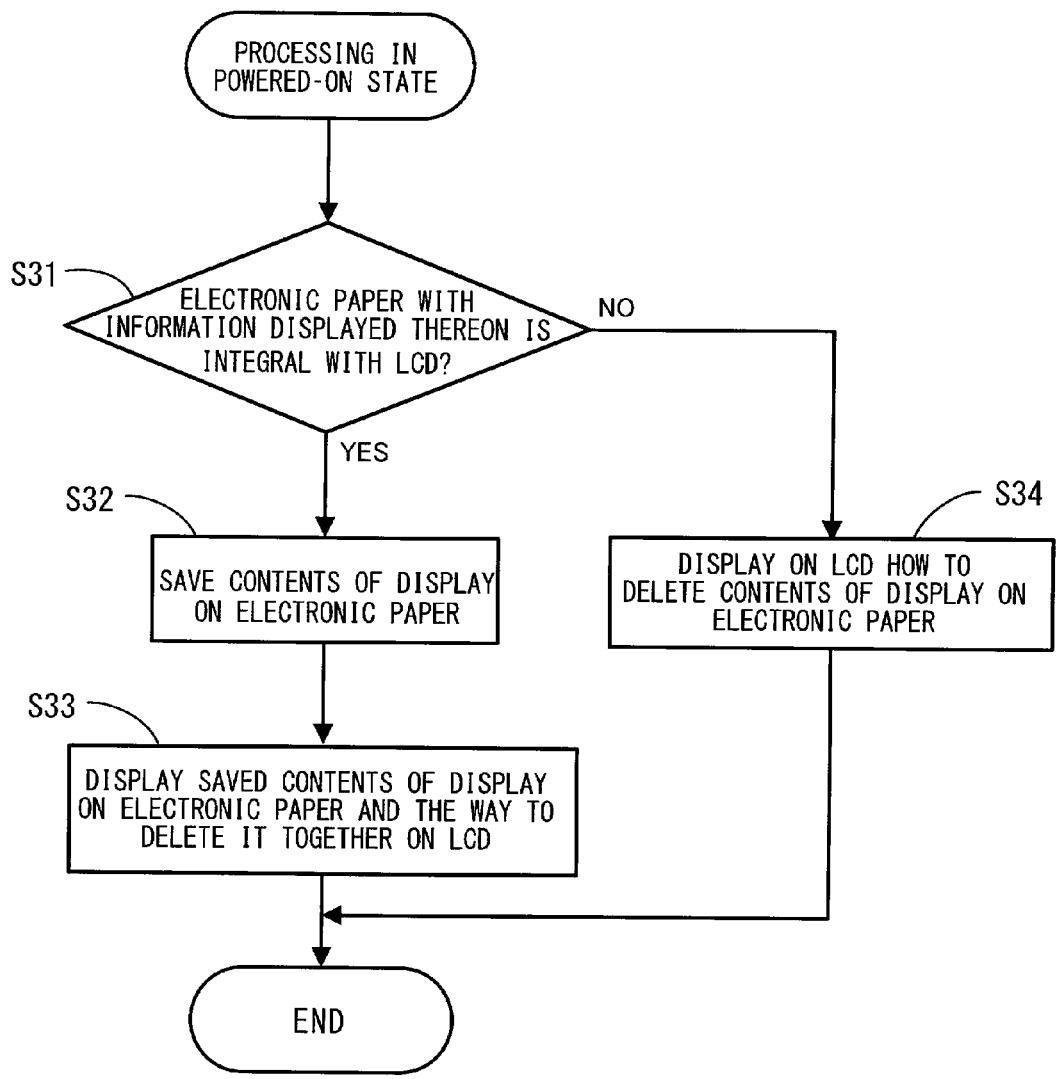

FIG.11

BATTERY REPLACEMENT

THE INTERNAL BATTERY IS NOT CHARGED BECAUSE
THE MACHINE IS NOT POWERED NOW.
UPON POWERING ON THE MACHINE, THE BATTERY
WILL BE DISCHARGED AND TIME SETTINGS MAY BE RESET.
ALTHOUGH CHARGING WILL BE COMPLETED AFTER A PERIOD OF
TIME FOLLOWING POWER-ON, YOU CANNOT MAKE TIME SETTING
AND THE LIKE IN THE MEANTIME. IF YOU NEED TO SET TIME QUICKLY,
PLEASE CHANGE THE BATTERY IN THE MAIN BODY WITH A CHARGED ONE.

HOW TO CHANGE BATTERY

1: OPEN THE UPPER COVER OF THE MAIN BODY
2: OPEN THE COVER MARKED "BATTERY"
   ON THE RIGHT FRONT OF THE MAIN BODY
3: TAKE OUT THE BATTERY AND SET A NEW BATTERY

CAUTION : SET THE BATTERY WITH ITS "+" POLE ON THE RIGHT
THIS DISPLAY WILL BE DELETED UPON BATTERY CHANGE OR
PRESSING OF CANCEL KEY.

FIG.13

```
            HOW TO MAKE INITIAL SETTINGS

BEFORE YOU PLUG THE POWER CABLE INTO
 AN OUTLET, MAKE SURE:

• NO USB CABLE IS CONNECTED TO THE MACHINE
 • IF A USB CABLE IS CONNECTED TO THE MACHINE,
   THE CABLE IS NOT CONNECTED TO A PC

IF YOU POWER ON THE MACHINE WITH THE MACHINE AND
 PC CONNECTED THROUGH A USB CABLE,
 MALFUNCTION CAN OCCUR WHEN YOU INSTALL SOFTWARE.
```

# ELECTRONIC DEVICE INCLUDING NON-VOLATILE DISPLAY PORTION

CROSS REFERENCE TO RELATED APPLICATION

This application claims priority from Japanese Patent Application No. 2006-341132 filed Dec. 19, 2006. The entire content of this priority application is incorporated herein by reference.

TECHNICAL FIELD

The present disclosure relates to an electronic device provided with a display portion, and a display control method and a display method for the display portion provided on the electronic device.

BACKGROUND

There have been image forming apparatuses that have an auxiliary operation portion using an electronic paper aside from a main operation portion. More specifically, such an apparatus displays counter information, paper jam history, and/or part counter information on the electronic paper. This allows a user to check count information and the like on the electronic paper even when the user has shut off power supply to the image forming apparatus in order to replace a part in the image forming apparatus, for example.

There is also a technique for displaying the operational procedure and progress of initial setup operations for an image forming apparatus on a computer display for smooth performance of the operations.

In regards to an image forming apparatus, there can be various information that should be provided to a user, and the information can vary depending on the status of the image forming apparatus. However, the conventional technique mentioned above that uses an electronic paper is configured to always display fixed types of information, such as counter information, paper jam history, and part counter information, on the electronic paper. Consequently, the technique cannot flexibly display information corresponding to various statuses of the image forming apparatus.

Also, the above-mentioned technique for displaying the procedure of initial setup operations and the like is burdensome as the user has to refer to a manual which comes with an image forming apparatus in a kit or install a program for initial setup operations into a computer when performing initial setup operations. Thus, the user can perform an inappropriate operation without reading the manual or installing the program for initial setup operations.

SUMMARY

A display control method according to the present invention is provided for a non-volatile display portion provided on an electronic device, the display control method includes:

displaying information of a type appropriate for a state of the electronic device on the display portion from among multiple types of information.

BRIEF DESCRIPTION OF THE DRAWINGS

Illustrative aspects in accordance with the invention will be described in detail with reference to the following figures wherein:

FIG. 5 schematically shows display information (1) in sleep state;

FIG. 6 schematically shows display information (2) in sleep state;

FIG. 8 schematically shows display information (1) in powered-off state;

FIG. 9 schematically shows display information (2) in powered-off state;

FIG. 10 is a flowchart illustrating processing in powered-on state;

FIG. 11 schematically shows display information (1) in powered-on state;

FIG. 13 schematically shows display information prior to initial setting operations.

DETAILED DESCRIPTION OF THE PREFERRED ILLUSTRATIVE ASPECTS

An illustrative aspect of the present invention will now be described with reference to FIGS. 1 through 13.
(Overall Configuration)

Figure 1:
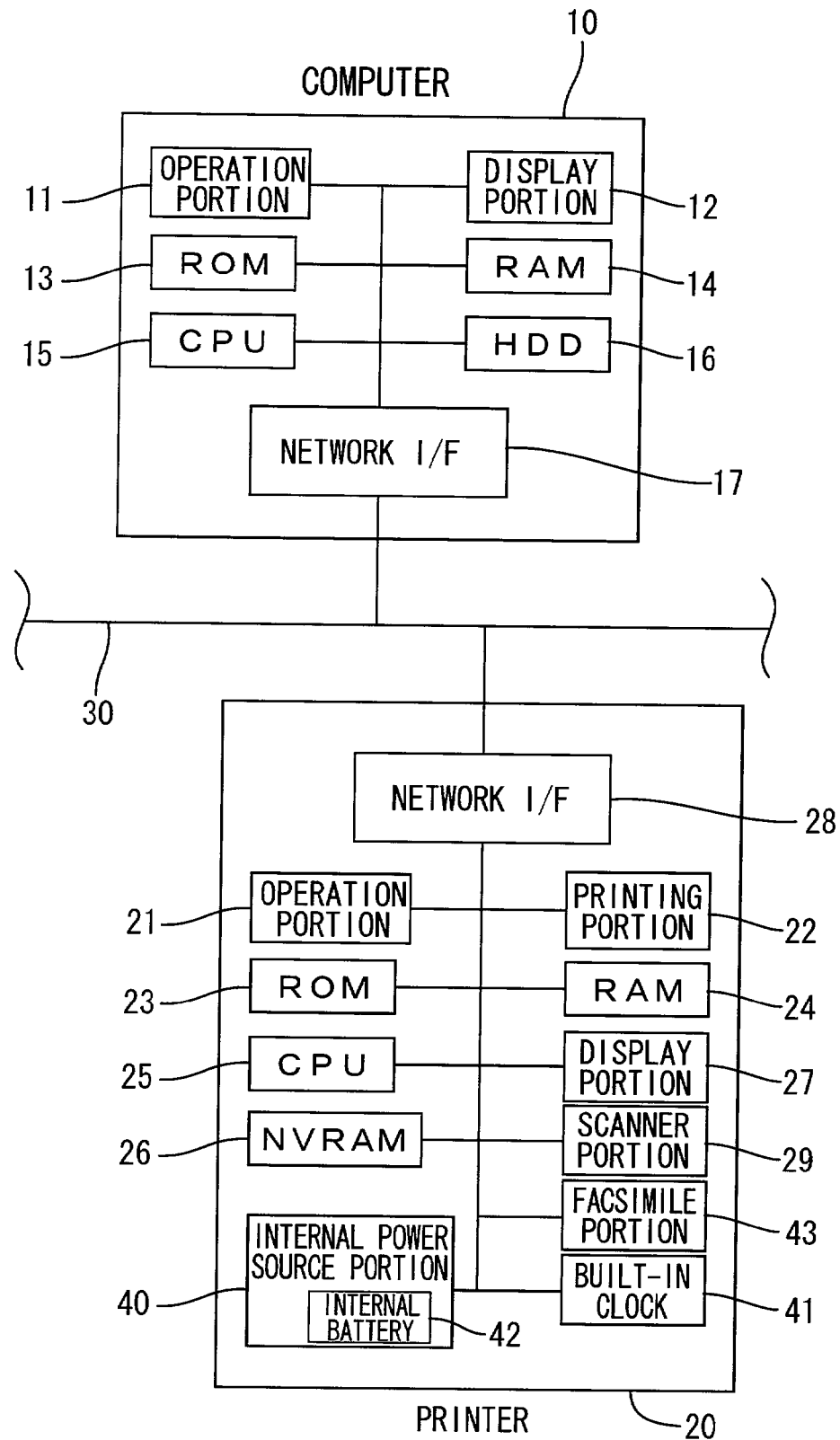
FIG. 1 is a block diagram showing a configuration of an image scanning system according to an illustrative aspect of the invention.

FIG. 1 is a block diagram showing a configuration of an image forming system. This image forming system is configured with a printer 20 (an example of "an electronic device" or "an image forming apparatus"), and an information processing apparatus (hereinafter called a computer 10) which is connected with the printer 20 via a communication line 30, such as a LAN.

The computer 10 is configured with an operation portion 11 for accepting external input operations, e.g., from a keyboard and a mouse, a display portion 12 such as a liquid crystal display, ROM 13, RAM 14, a CPU 15, a hard disk drive 16, a network interface 17 which is connected to the communication line 30, and so on. In the hard disk drive 16, a printer driver, other application software and the like are stored, and the CPU 15 reads out and executes the printer driver and the like from the hard disk drive 16 in accordance with an execution directive from the operation portion 11.

The printer 20 is configured with an operation portion 21 which is composed of various keys and the like, a printing portion 22 for performing printing on paper as a recording medium, ROM 23, RAM 24, a CPU 25, NVRAM (non-volatile memory) 26, a display portion 27, a network interface 28, a scanner portion 29, a facsimile portion 43, and so forth. The CPU 25 controls the individual portions while storing the result of processing in the RAM 24 and/or the NVRAM 26 in accordance with a program stored in the ROM 23. The scanner portion 29 illuminates an original set therein with light from a light source not shown, e.g., a lamp, to scan the image of the document and outputs the image data. The network interface 28 is connected to the communication line 30, and the printer 20 communicates data, such as printing data and directive signals, with the computer 10 via the network interface 28.

The printer 20 further includes an internal power source portion 40 and a built-in clock 41. The internal power source portion 40 has an internal battery 42, and charges the internal battery 42 with power supplied from an external power source (not shown) while the printer 20 is supplied with power from the external power source (which will be hereinafter referred to as being "powered on"). The internal power source portion 40 also monitors the voltage between a pair of connection terminals (not shown) which is connected to the internal battery 42, for example.

The built-in clock 41 keeps the current time, and it operates with power supply from the external power source while the printer is powered on, and with power supply from the internal battery 42 when power supply from the external power source is shut off (hereinafter referred to as being "powered off"). Therefore, if the amount of charge of the internal battery 42 becomes low when the printer 20 is powered off, the built-in clock 41 cannot get sufficient supply of power and stops its operation. Thus, it will be required to reset the current time setting after the printer 20 is powered up again.
(Details of the Operation Portion and the Display Portion of the Printer)

Figure 2:
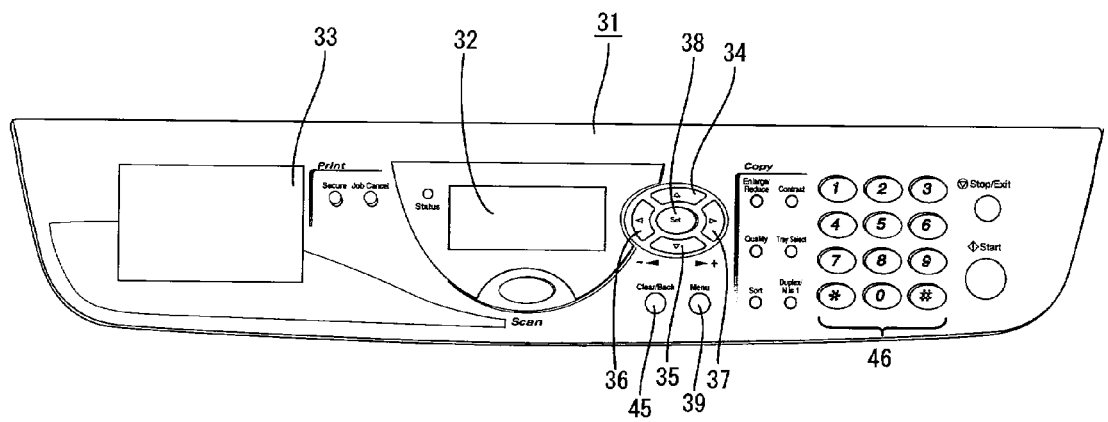
FIG. 2 illustrates the outer appearance of an operation panel.

FIG. 2 illustrates the outer appearance of an operation panel 31 that forms the operation portion 21 of the printer 20. On the operation panel 31, a liquid crystal display 32 and an electronic paper display 33 are arranged side by side. On the liquid crystal display 32, various types of information are displayed when the printer 20 is in normal state in which it can perform printing operation immediately, for instance. The liquid crystal display 32 is not supplied with power when the printer 20 is in sleep state or powered off, for instance. The liquid crystal display 32 is configured as a so-called volatile display device which deletes displayed contents when power is not supplied in such states.

On the other hand, the electronic paper display 33 (an example of "a non-volatile display portion") is a non-volatile display device. As mentioned later, the electronic paper display 33 is configured as a so-called non-volatile display device that can retain displayed contents even when power is not supplied, such as in sleep state or powered-off state. While there are several known methods of electronic paper, the present illustrative aspect adopts an electrophoresis method that uses microcapsules, for example. To be specific, the electronic paper display 33 carries out a display operation by forming a predetermined electric field to physically move (or electrophorese) particles (i.e., microcapsules) that make up a display medium. Accordingly, the moved (electrophoresed) particles can maintain that state for a certain time period even if power supply to the electronic paper display 33 is shut off, which consequently gives the electronic paper display 33 a characteristic of retaining displayed contents for a certain time period.

On the operation panel 31, an Up key 34, a Down key 35, a Left key 36, a Right key 37, a Set key 38, a Menu key 39, a Cancel key 45, and numeric keys 46 are arranged.
(Control of Contents for Display)

The CPU 25 of the printer 20 determines the state of the printer 20, such as whether the printer 20 is in a state in which it should transition to sleep state, whether it is powered off, or whether it has returned to normal state (return from sleep state to normal state, or return to normal state upon power-on after being powered off), and provides display information appropriate for the state on the electronic paper display 33. At this point, the CPU 25 functions as an example of "a first determination portion" or "a display control portion". In the following, description will be given separately for when transitioning to sleep state, in powered-off state, and powered-on state.

[In Transition to Sleep Mode]

The printer 20 transitions to a sleep state (also called "soft switch-off" as opposed to power-off), in which only required minimum functions are activated with lowered power consumption, when predetermined conditions are met, such as none of the keys of the operation panel 31 has been operated and data, such as printing data, has not been transmitted from the computer 10 for a predetermined time period. When the printer 20 has transitioned to sleep state, power supply to the liquid crystal display 32 and the electronic paper display 33 is also shut off.

Figure 3:
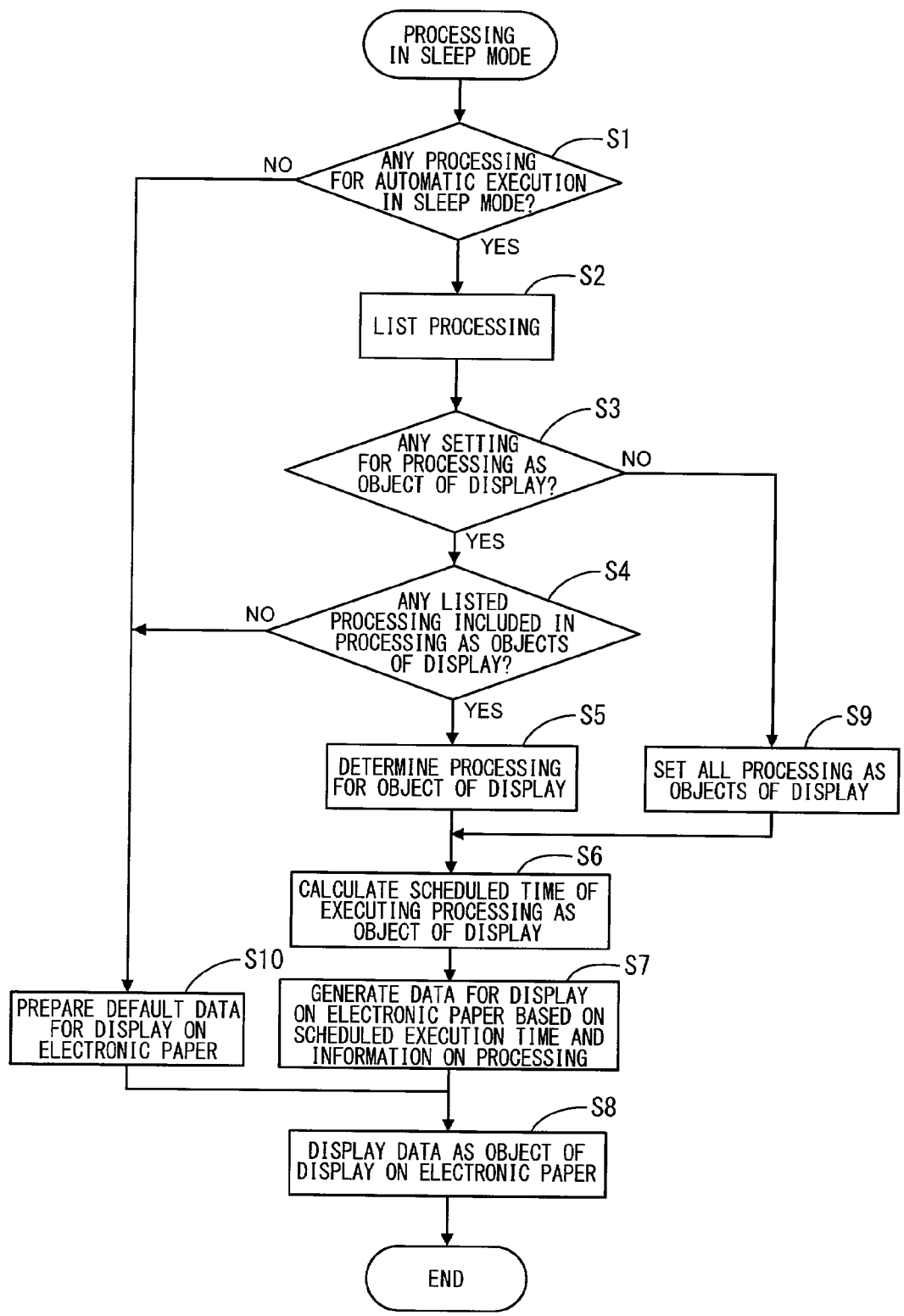
FIG. 3 is a flowchart illustrating sleep mode processing.

FIG. 3 shows a flowchart illustrating sleep mode processing which is executed by the CPU 25 in the course of transition to the sleep state. The CPU 25 executes this sleep processing when the predetermined conditions are met, and thereafter the printer 20 goes into the sleep state.

First, at S1, it is determined whether there is any processing that will be automatically executed during sleep state. The sleep state is a state in which no request for printing processing or scanner processing is being made to the printer 20. Therefore, various automatic maintenance operations (an example of "a predetermined operation") are set to be executed in the sleep state. Examples of the automatic maintenance operations include an operation for cleaning an ink head contained in the printing portion 22 and an operation for checking the illumination of the lamp of the scanner portion 29. At this point, the CPU 25, for example, functions as an example of "an operation control portion" or "a maintenance portion".

Figure 4:
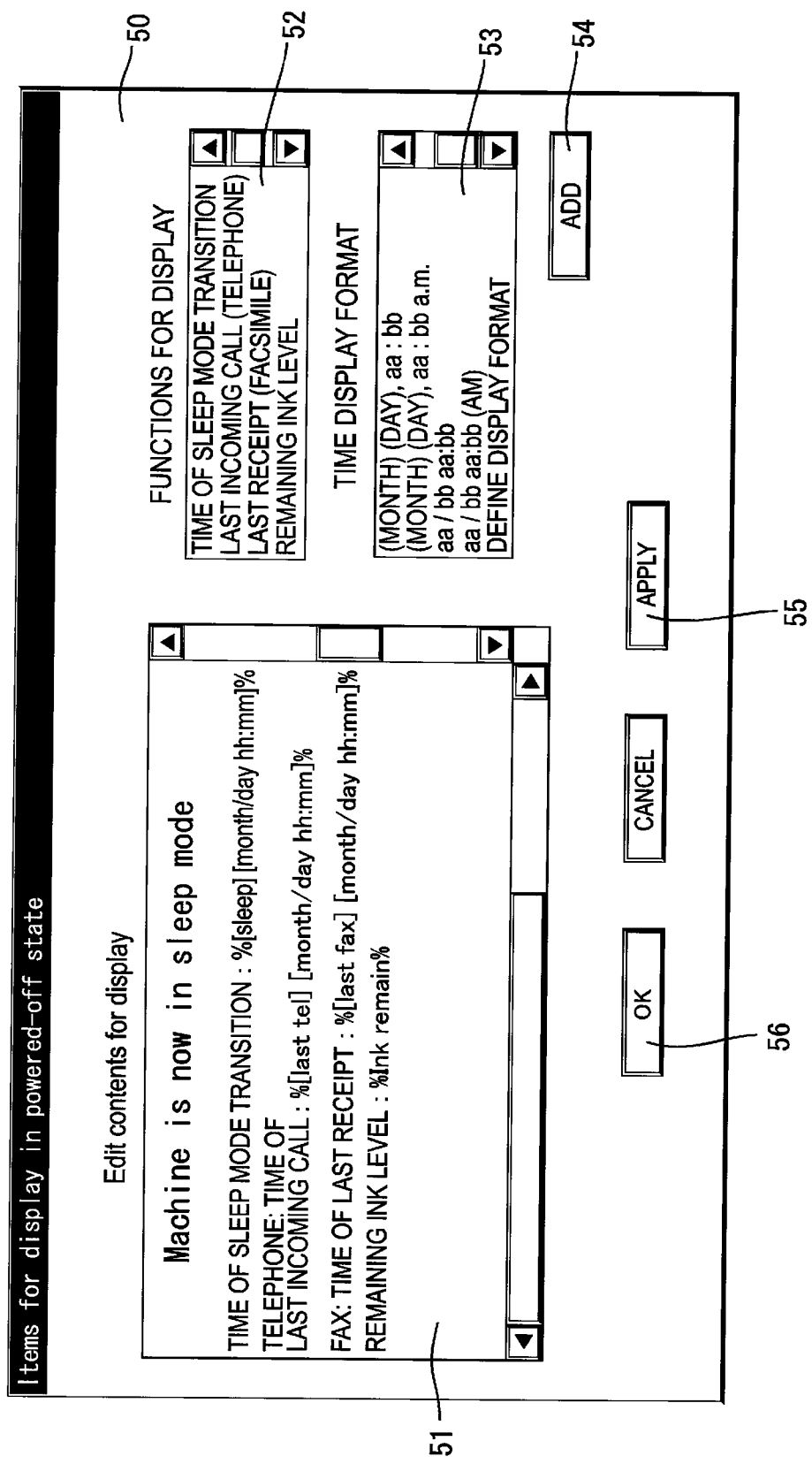
FIG. 4 is a simplified illustration of a dialogue box.

Then, if the automatic maintenance operations are enabled and they can be executed in sleep state, for example (S1: Yes), processing for the cleaning operation and/or processing for the lamp illumination checking operation are listed at S2. FIG. 4 illustrates a dialogue box 50 which is displayed on the display portion 12 of the computer 10. The dialogue box 50 is displayed through display control by the CPU 15 based on the printer driver installed in the computer 10. The dialogue box 50 is intended for setting contents for display on the electronic paper display 33 in sleep state or powered-off state, which will be discussed below.

Specifically, in the dialogue box 50, a displayed content editing field 51, a displayed function designation field 52, and a display format designation field 53 are arranged. In the displayed function designation field 52, the names of functions (or type names) that can be displayed are listed. In the display format designation field 53, display formats that are available for display are listed, and by pressing an Add button 54 with desired items designated in fields 52 and 53, the designated items become reflected in the displayed content editing field 51. In the displayed content editing field 51, a message or the like can also be directly entered through the user's operation on the operation portion 11.

Then, by pressing an Apply key 55 or an OK key 56, contents that are finally reflected in the displayed content editing field 51 are set as items for display, and the setting information is sent to the printer 20 side. The CPU 25 stores the setting information sent from the computer 10 in, e.g., the NVRAM 26.

At S3 in FIG. 3, the CPU 25 determines whether the setting information from the computer 10 is stored in the NVRAM 26. If the setting information is stored (S3: Yes), the CPU 25 determines whether any processing designated in the setting information is included in the processing which was listed at S2 (S4). If processing designated in the setting information is included in the listed processing (S4: Yes), information on the listed and designated processing is decided as an object of display (S5). Here, the CPU 25 functions as an example of a "designation portion". Then, the scheduled time of executing the processing which was decided as an object of display at S6 is calculated. The cleaning operation and the lamp illumination checking operation, for example, are set to be periodically executed at predetermined time intervals. Accordingly, the scheduled time of the next execution can be calculated from the time intervals, the current time, and the time of the last execution, and the scheduled execution time is stored in the NVRAM 26.

The CPU 25 reads out the scheduled execution time, setting information, listed information and the like from the NVRAM 26 at S7, and creates display image data to be displayed on the electronic paper display 33 based on them, and produces a display corresponding to the display image data (S8). Here, the display information shown in FIG. 5 and the one in FIG. 6 are displayed on the electronic paper display 33, for instance. In FIG. 5, information on conditions for return from sleep state to normal state as well as the details and scheduled execution times of automatic maintenance operations that can be executed during sleep state are displayed. The information of FIG. 5 represents an example of "information on advance notice". In FIG. 6, the time of transition to sleep mode, the time of the last incoming telephone call and the last facsimile receipt in the facsimile portion 43, and the amount of remaining ink for each color are displayed. The matters displayed in FIG. 6 are designated by the user in the dialogue box 50. The printer 20 can then transition to sleep state after the processing at S8 ends.

If the setting information is not stored in the NVRAM 26 at S3 (S3: No), any processing listed at S2 is set as an object of display (S9). However, the limited display area of the electronic paper display 33 can be more effectively utilized when objects of display are limited in advance in the dialogue box 50.

Also, if the automatic maintenance operations are disabled and there is no processing to be executed during sleep state at S1 (S1: No), or if there is processing listed at S4 but the processing is not designated in the setting information (S4: No), prepared default display information is displayed on the electronic paper display 33, or the electronic paper display 33 is turned off at S10. Examples of the default display information may include a message to the effect that the printer 20 is now in sleep state, and information on functions that are included only in setting information (e.g., the time of transition to sleep mode, the time of the last incoming telephone call and the last facsimile receipt in the facsimile portion 43, and the amount of remaining ink of each color, and the like, which were mentioned above), for example.

[In Powered-Off State]

Figure 7:
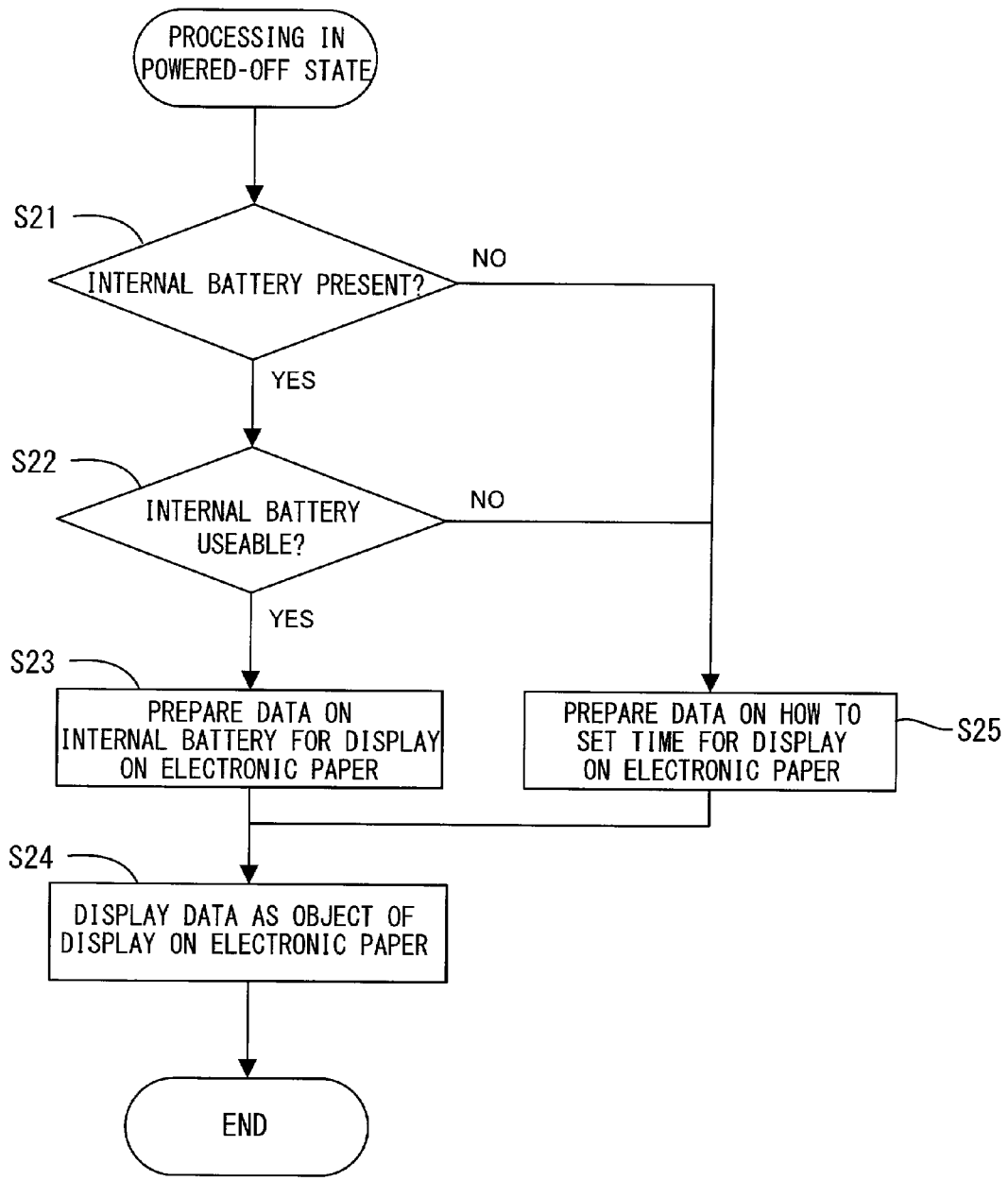
FIG. 7 is a flowchart illustrating processing during powered-off state.

FIG. 7 shows a flowchart illustrating the processing which is performed when the printer 20 is powered off. When a power switch (not shown) of the printer 20 is turned off or there is a power failure, power supply to the printer 20 is shut off (i.e., the printer 20 is powered off). In this situation, the processing illustrated in FIG. 7 is periodically executed using remaining electric power or electric power of the internal power source portion 40. At this point, the CPU 25 functions as an example of a "second determination portion". Specifically, it is first determined at S21 whether the internal battery 42 is normally set in the internal power source portion 40 in the first place based on the result of monitoring by the internal power source portion 40. If the internal battery 42 is normally set (S21: Yes), it is then determined at S22 whether the internal battery 42 is charged enough to be usable. If it is determined that the internal battery 42 is usable (S22: Yes), the display information shown in FIG. 8 is generated at S23, and displayed on the electronic paper display 33 at S24. FIG. 8 shows an example of "information on the internal battery". For example, the following matters can be displayed.

(a) That the internal battery 42 is not charged because the printer 20 is powered off (b) That the amount of charge will reduce due to lack of charging and the clock setting of the built-in clock 41 may be reset upon power-on after the halt of the built-in clock 41

(c) How to replace the battery

On the other hand, when the internal battery 42 is not normally set (S21: No), if the amount of charge of the internal battery 42 has reduced to a predetermined value or lower (S22: No), the built-in clock 41 may stop. Thus, it is necessary to reset its time when the printer 20 is powered on again. Thus, the display information shown in FIG. 9 (an example of "information on how to set the built-in clock") is generated at S25, and displayed on the electronic paper display 33 at S24. Specifically, it is shown to set a time by pressing the menu key 39, Up key 34, Down key 35, Left key 36, Right key 37, Set key 38, numeric keys 46 and the like. Furthermore, the identification number (e.g., a serial number) of the printer 20 which will be required at the time of contact with the manufacturer is also displayed.

For example, when the amount of charge of the internal battery 42 is low and the printer 20 is powered on for time setting and soon powered off again, the internal battery 42 is not sufficiently charged and time setting will be required again. Although it is of course possible to give priority to replacement of the internal battery 42 with sufficiently charged one, not so many users would be preparing for the replacement in general. Thus, this illustrative aspect has time setting of the built-in clock 41 be performed in preference to the replacement of the internal battery 42.

[In Powered-On State]

FIG. 10 shows a flowchart illustrating the processing performed when the printer 20 is powered on. When various display information is being displayed on the electronic paper display 33 as a result of the sleep mode processing (FIG. 3) or processing in powered-off state (FIG. 7) and subsequently the CPU 25 determines that the printer 20 has returned to normal state from sleep state or powered-off state, the CPU 25 functions as an example of a "third determination portion".

For example, if the printer 20 is configured such that a second liquid crystal display (not shown) is arranged over the electronic paper display 33 at the same position and a setting has been made for selectively switching between the second liquid crystal display and the electronic paper display 33 for use, the determination results in "Yes" at S31 and the flow proceeds to S32. At S32, the display information displayed on the electronic paper display 33 is stored as data in the NVRAM 26, for example. Then, the second liquid crystal display which is positioned in front of the electronic paper display 33 is activated, and display information with contents almost the same as the display information which was displayed on the electronic paper display 33 is displayed on the second liquid crystal display based on the data stored in the NVRAM 26 (S33). The way to delete the display information on the second liquid crystal display is also displayed.

FIG. 11 shows an example of display information that can be displayed on the second liquid crystal display at this point. As shown, display information which was being displayed on the electronic paper display 33 before return to the normal state is information on the internal battery, and information almost the same as that information is being displayed. Under the information, replacement of the battery and pressing of the Cancel key 45 are shown as the ways to delete the display information.

Figure 12:
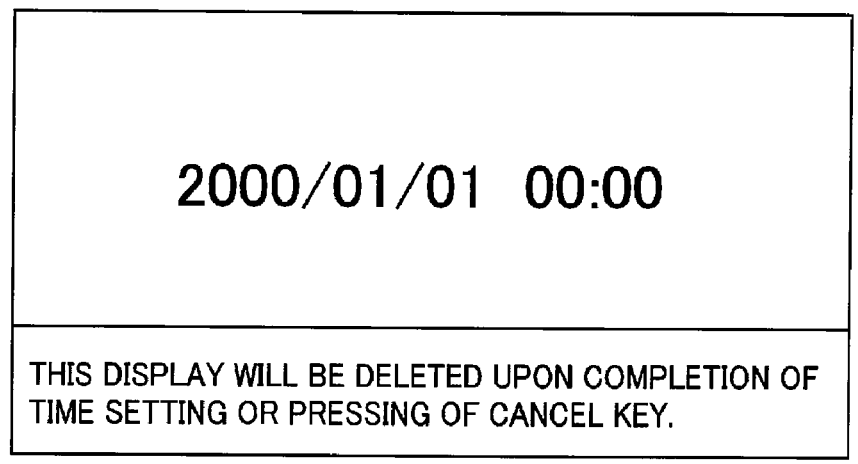
FIG. 12 schematically shows display information (2) in powered-on state.

Meanwhile, if the printer 20 is not provided with the second liquid crystal display, for example, or if provided with one but a setting not to use the second liquid crystal display has been made (S31: No), the display information shown in FIG. 8 or 9, for example, is kept displayed as it is on the electronic paper display 33 at S34. In addition, as shown in FIG. 12, information on how to delete the display information displayed on the electronic paper display 33 as well as the currently set time (in the figure, the time at which resetting is done) are displayed on the liquid crystal display 32.

Out of the displayed matters, the display saying that "This display will be deleted upon pressing of Cancel key" particularly means that it confirms the user's intention as to whether it is necessary to delete the display information on the electronic paper display 33. Accordingly, at this point, the display portion 27 and the cancel key 45 function as examples of a "confirmation portion". Thereafter, the CPU 25 determines whether the user has pressed the cancel key 45 as an indication of his/her intention to delete the display information, and when it determines that the cancel key has been pressed, it deletes the display information on the electronic paper display 33. At this point, the CPU 25 functions as an example of a "third determination portion".

Furthermore, in this illustrative aspect, after the printer 20 is purchased and before initial setting operations are performed, for example, the display information shown in FIG. 13 is displayed on the electronic paper display 33. This display information represents an example of "information on initial setting operations". As illustrated in FIG. 13, if the printer 20 is powered on with the printer 20 and the computer 10 interconnected through a USB cable prior to initial setting operations, malfunction can occur when a printer driver is installed. Thus, if the display information shown in FIG. 13 is shown on the electronic paper display 33 when the printer 20 is taken out of a kit after its purchase, it can prevent the printer 20 from being powered on before initial setting operations. Also, the user can perform initial setting operations without having to refer to a manual and the like. The CPU 25 also recognizes this initialized state when setting conditions and the like of the printer 20 are initialized after initial setting operations are once performed, for example, and displays the information shown in FIG. 13 on the electronic paper display 33.

(Effects of the Present Illustrative Aspect)

According to this illustrative aspect, appropriate display information (see FIGS. 5, 6, 8, 9, and 11 through 13) can be displayed on the electronic paper display 33 in accordance with the state of the printer 20, for example a state before initial setting operations, sleep state, and powered-on/off state.

In addition, when the printer 20 is powered off, display information on how to set the built-in clock 41 (see FIG. 9) can be displayed on the electronic paper display 33. Thus, the user can easily set the time of the built-in clock 41 upon power-on with reference to the display information without having to consult a manual and the like, for example.

Furthermore, display information on advance notice (see FIG. 5) relating to preprogrammed operations (automatic maintenance operations) which will be performed when predetermined conditions are met can be displayed on the electronic paper display 33 before those conditions are met (e.g., in powered-off state). Therefore, even if any of the operations is performed at an unexpected time for the user, the user's confusion can be relieved.

In addition, display information displayed on the electronic paper display 33 can be deleted in accordance with the user's intention.

<Other Illustrative Aspects>

The present invention is not limited to the illustrative aspect which was illustrated with the description and drawings, but such aspects as follows are also encompassed in the technical scope of the invention, for example:

(1) The "image forming apparatus" is not limited to an ink-jet printer as shown in the above illustrative aspect and may be a laser printer.

(2) The "electronic device" can be any electronic device with a display screen, e.g., a beverage supply device, not limited to the image forming apparatus (i.e., an ink-jet printer) as shown in the above illustrative aspect. Some beverage supply devices execute an operation associated with maintenance, such as an operation for cleaning an extraction system, at an unexpected time for users such as at nighttime, so that information on such maintenance operations is preferably displayed on a non-volatile display portion.

(3) "Displaying information of a type appropriate for a state of the electronic device on the display portion from among multiple types of information" includes displaying of information of a type appropriate for the state of the electronic device in accordance with an operation based on the user's judgment which is performed on an operation portion provided on the electronic device, for example.

(4) The "third determination portion" includes a configuration which automatically determines whether display of display information shown on the display portion has become unnecessary based on the state of the device body of the electronic device (e.g., a return from sleep state to normal state in response to an operation on the operation portion, or resumption of power supply), for example, in addition to one based on the user's intention. For instance, such a configuration is possible that automatically delete the display information upon elapse of a predetermined time period after a return to normal state.

(5) The "designation portion" also includes a configuration for identifying information of a specific type based on an operation signal from the operation portion 21 provided on the image forming apparatus, in addition to the configuration shown in the above-described illustrative aspect that identifies such information based on a directive signal from a terminal apparatus which is communicatively connected with the image forming apparatus.

(6) For instance, such a configuration is possible that has only display information relating to initial setting operations, such as the one shown in FIG. 13, and displays the display information on the electronic paper display 33 before initial setting operations.

(7) In a case where the printer 20 is configured such that a liquid crystal display and an electronic paper display are arranged at the same position and selectively switched for use, for instance, switching processing for turning off the liquid crystal display and turning on the electronic paper display can be provided at S8 in FIG. 3 and S24 in FIG. 7.

(8) The illustrative aspect above is configured to give priority to time setting of the built-in clock 41 over the replacement of the internal battery 42 when the internal battery 42 is not usable or the like. However, it is also possible to allow the user to change the setting to a configuration which gives priority to replacement of the internal battery 42 over the time setting of the built-in clock 41 through operation on the operation portion 21, for example. This configuration is effective when the user has an alternative internal battery which is sufficiently charged on hand in advance.

(9) The "confirmation portion" may also provide voice guidance on whether display information should be deleted or not and confirm the user's intention based on the user's operation which is made on the operation portion in response to the guidance.

What is claimed is:

1. An electronic device, comprising:
    a non-volatile display portion;
    a first determination portion for determining a state of the electronic device;
    a display control portion configured to display information of a type appropriate for the state determined by the first determination portion on the display portion from among multiple types of information;
    an internal battery; and
    a second determination portion configured to determine whether the internal battery is usable, wherein
    the display control portion displays the information on the display portion based on shut-off of power supplied from an external power source, and if the second determination portion determines that the internal battery is usable, the display control portion displays information regarding the internal battery on the display portion when the power supplied from the external power source is shut off.

2. The electronic device according to claim 1, further comprising a built-in clock, wherein if the second determination portion determines that the internal battery is unusable, the display control portion displays information on how to set the built-in clock on the display portion when the power supplied from the external power source is shut off.

3. The electronic device according to claim 1, comprising
    a third determination portion configured to determine if it is necessary to delete information displayed on the display portion, wherein
    the display control portion deletes the information when the third determination portion determines that it is necessary to delete the information.

4. The electronic device according to claim 3, further comprising
    a confirmation portion configured to allow a user to confirm whether to delete the information displayed on the display portion, wherein
    the third determination portion determines whether or not it is necessary to delete the information based on a result of confirmation by the confirmation portion.

5. An electronic device, comprising:
    a non-volatile display portion;
    an internal battery;
    a processing unit;
    a memory having executable instructions stored thereon that, when executed by the processing unit, perform
        determining a state of the electronic device;
        displaying information of a type appropriate for the determined state on the display portion from among multiple types of information;
        determining whether the internal battery is usable;
        displaying the information on the display portion based on shut-off of power supplied from an external power source; and
        displaying information regarding the internal battery on the display portion when the power supplied from the external power source is shut off if the internal battery is determined to be usable.

6. The electronic device according to claim 5, further comprising a built-in clock, wherein the instructions, when executed by the processing unit, further perform
    displaying information on how to set the built-in clock on the display portion when the power supplied from the external power source is shut off if the internal battery is determined to be unusable.

7. The electronic device according to claim 5, wherein the instructions, when executed by the processing unit, further perform
    determining if it is necessary to delete information displayed on the display portion; and
    deleting the information when it is determined that it is necessary to delete the information displayed on the display portion.

8. The electronic device according to claim 7, wherein the instructions, when executed by the processing unit, further perform
    allowing a user to confirm whether to delete the information displayed on the display portion,
    wherein the determining if it is necessary to delete information displayed on the display portion is based on whether a user confirms that it is necessary to delete the information displayed on the display portion.

* * * * *